Figure 1:
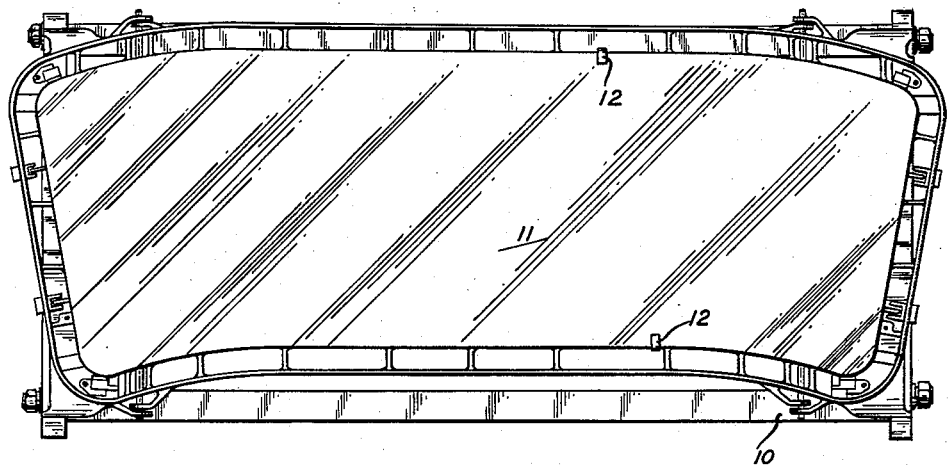

July 13, 1954  O. E. RUGG ET AL  2,683,334

GLASS BENDING

Filed July 16, 1952

O. E. RUGG
R. L. WOEHRLE
INVENTOR.

BY E. C. McRae
J. R. Faulkner
D. H. Oster
ATTORNEYS

UNITED STATES PATENT OFFICE 2,683,334

GLASS BENDING

Ormund E. Rugg, Detroit, and Robert L. Woehrle, Lincoln Park, Mich., assignors to Ford Motor Company, Dearborn, Mich., a corporation of Delaware Application July 16, 1952, Serial No. 299,204

4 Claims. (Cl. 49—84)

This invention is concerned with the bending of sheet or plate glass to a predetermined configuration and more particularly to an improved procedure for the production of laminated, bent, vehicular windshields.

Curved or bent, laminated windshields are conventionally manufactured by passing two superimposed sheets of glass through a bending lehr while supported upon an appropriately shaped bending mold. In passing through this bending lehr, the temperature of the superimposed glass sheets is gradually raised to about 1140° F. At this temperature the glass is sufficiently plastic to assume a shape determined by the configuration of the glass shaping mold. This process has been repeatedly described in the current periodical and patent literature and need not be further described here. This process is intended as an elaboration upon and improvement over a process described in a copending United States patent application Serial No. 293,773, filed June 16, 1952, in the name of Ormund E. Rugg and assigned to the assignee of this invention.

Figure 2:
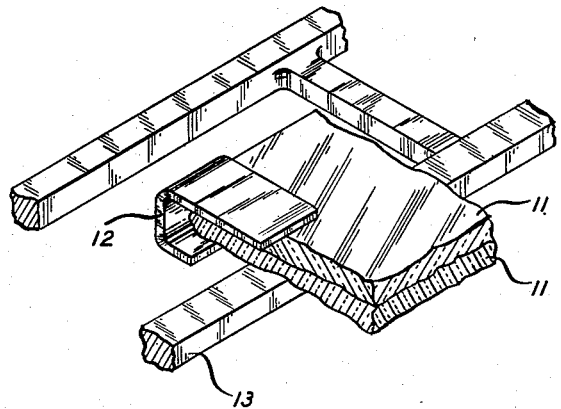

This invention is best understood by reference to the drawing in which:

Figure 1 is a plan view of a glass bending fixture with the glass sheets in place, and Figure 2 is a view partially in section of the two superimposed sheets of glass supported as described in this invention.

In Figure 1 a glass bending mold is indicated generally by the numeral 10. The glass sheets to be bent are indicated at 11. Clips 12 for the support of the glass sheets during the bending process are shown in place.

Figure 2 illustrates the structure and application of clips 12. As shown in Figure 2 these clips are roughly shaped to resemble a capital "L" and slipped over the edges of glass sheets 11. The most satisfactory material for the manufacture of these clips 12 has been found to be half hard aluminum sheet about twenty thousandths of an inch thick. The width of these clips is about three eighths of an inch. The long side of the clip may conveniently measure eleven sixteenths of an inch and the short side five thirty-seconds of an inch. These dimensions are only given as a typical example and may be widely varied without departing from the spirit of the invention. As shown in Figure 2, these clips are applied with the long side uppermost and with the short side clearing rail 13 upon which the glass rests when it assumes its final shape.

The exact location of these clips longitudinally of the glass sheet is not critical except that they should be well removed from the end sections and should not be aligned with each other so that any stress in the glass induced by their presence may not be concentrated. During the actual bending process the glass sheets are highly stressed and almost certainly are unequally stressed. These clips serve to distribute or equalize the stress between the two sheets of glass. The use of these clips has resulted in a lowering of glass breakage in the lehr from twelve per cent to less than four per cent.

We claim as our invention:

1. In a process for the production of bent laminated glass, the steps of placing at least two superimposed sheets of glass upon a glass bending mold which supports the unbent glass only at opposite ends of said sheets, applying a clip to the superimposed sheets of glass at a location remote from the supported ends, said clip comprising two approximately parallel members spaced apart by a distance slightly greater than the combined thickness of the superimposed sheets of glass whereby substantial separation of the glass sheets is prevented and the glass sheets support each other, said clip being supported in space solely by the superimposed glass sheets, and passing the assembly of bending mold, superimposed glass sheets and clips through a heated bending lehr.

2. In a process for the production of bent laminated glass, the steps of placing at least two superimposed sheets of glass upon a glass bending mold which supports the unbent glass only at opposite ends of said sheets, applying at least two clips to the superimposed sheets of glass at opposite sides of the glass sheets and at locations remote from the ends of said superimposed sheets, said clips comprising two approximately parallel members spaced apart by a distance slightly greater than the combined thickness of the superimposed sheets of glass whereby substantial separation of the glass sheets is prevented and the glass sheets support each other, and said clips being supported in space solely by the superimposed glass sheets, and passing the assembly of bending mold, superimposed glass sheets and clips through a heated bending lehr.

3. In a process for the production of bent laminated glass, the steps of placing at least two superimposed sheets of glass upon a glass bending mold which supports the unbent glass only at opposite ends of said sheets, applying at least two clips to the superimposed sheets of glass at opposite sides of the glass sheets and at locations remote from the ends of said superimposed sheets and longitudinally displaced with respect to each other, said clips comprising two approximately parallel members spaced apart by a distance slightly greater than the combined thickness of the superimposed sheets of glass whereby substantial separation of the glass sheets is prevented and the glass sheets support each other, said clips being supported in space solely by the superimposed glass sheets, and passing the assembly of bending mold, superimposed glass sheets and clips through a heated bending lehr.

4. In a process for the production of bent laminated glass, the steps of supporting at least two superimposed sheets of glass upon a bending mold the working surfaces of which enclose an area slightly less than the glass sheets to be bent, applying at least two clips to the superimposed sheets of glass at opposite sides of the glass sheets and at locations remote from the ends of said superimposed sheets, said clips comprising two approximately parallel members spaced apart by a distance slightly greater than the combined thickness of the superimposed sheets of glass, the dimensions of the superimposed sheets, clips and working surfaces of the mold being such that the lower portion of the clip is entirely outside of the area enclosed by the working surface of the mold, said clips being supported in space solely by the superimposed sheets and serving to prevent substantial separation of said sheets, and passing the assembly of bending mold, superimposed sheets and clips through a heated bending lehr.

References Cited in the file of this patent

UNITED STATES PATENTS

| Number | Name | Date |
| --- | --- | --- |
| 2,003,383 | Miller | June 4, 1935 |
| 2,261,023 | Galey | Oct. 28, 1941 |
| 2,518,896 | Jendrisak | Aug. 15, 1950 |